Nov. 15, 1938.  A. CORBETT  2,136,583
UTILITY CONDUIT
Original Filed May 22, 1936
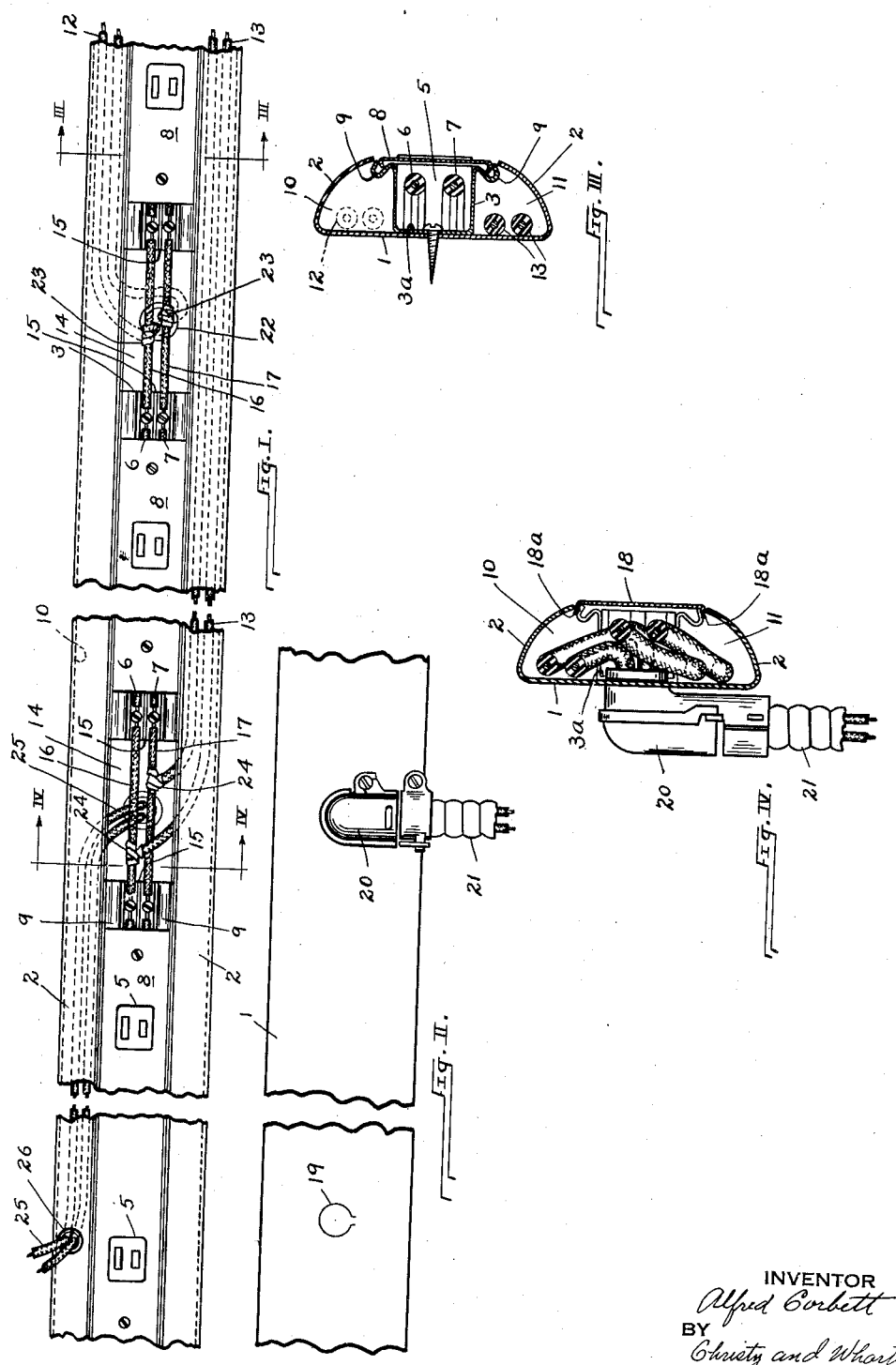
INVENTOR
Alfred Corbett
BY
Christy and Wharton
ATTORNEYS Patented Nov. 15, 1938

2,136,583

UNITED STATES PATENT OFFICE 2,136,583

UTILITY CONDUIT

Alfred Corbett, Irwin, Pa., assignor to National Electric Products Corporation, a corporation of Delaware Application May 22, 1936, Serial No. 81,202
Renewed April 16, 1938

4 Claims. (Cl. 247—3)

This invention relates to a multiple-outlet, multiple-channel duct.

The object of the invention herein disclosed is to provide a conduit of particular suitability for mounting upon building walls, for example, as an element of a baseboard or as a chair rail, after the walls have been completed, and without cutting into a baseboard or any other region of the wall surface; which conduit is adapted for housing lengths of multiple outlet duct, or plug-in strip. Further it is the object of my invention to provide in such conduit a plurality of enclosed channels for housing the electrical conductors of a plurality of circuits in physically separated position; and within the bounds of the conduit structure to provide at intervals junction spaces, or junction boxes, for feed connection and for taking off branch circuits.

It is further an object of my invention to provide the above functional features in a conduit which is of simple structure, and which is of simple and pleasing external appearance.

In the accompanying drawings Fig. I is a fragmentary plan view of my conduit, with certain of the cover elements of the structure removed to expose the junction regions within the conduit.

Fig. II is a fragmentary bottom plan view of the conduit, illustrating one form of feed connection thereto.

Fig. III is a cross-sectional view, taken on the plane of the section line III—III of Fig. I, between junction regions of the conduit.

Fig. IV is a cross-sectional view, taken on the plane of the section line IV—IV of Fig. I, at a junction region of the conduit.

In the drawing, the conduit shell, or body, comprises a base 1, and convergently curved side walls 2 upstanding from the base. Desirably, as shown, the base 1 and side walls 2 are formed from a single piece of metal. The base 1 is also shown flat to lie upon a plane surface, but may be formed with any desired irregularity of contour to match with an irregular surface upon which the conduit is to be mounted.

As shown particularly in Figs. I and III of the drawing, the conduit region lying between the opposed edges of the side walls 2 is occupied primarily by multiple outlet duct. This multiple outlet duct, in accordance with preferred practice, has a housing for electrical conductors formed as a channel element 3 and a channel cover 8, receptacle elements 5 being at intervals electrically connected with the conductors 6 and 7 of the duct, and accessible by way of openings through the cover strip 8 forming an element of the duct housing.

The channel element of the duct housing is of relatively light-gauge resilient metal, and as shown is formed to provide at the upper edges of its side walls 3 recurved lateral flanges 9, which in the duct perform the primary function of resiliently engaging the cover strip 8 to the channel element of the housing. In the conduit assembly the opposed edges of the conduit side walls 2 are spaced apart such distance that they partially overlie these lateral resilient flanges of the multiple outlet duct housing. The multiple duct assembly may thus be introduced into, and engaged with, the conduit shell either by entering it into an open end of the conduit shell and slipping it therealong, or by rocking the multiple outlet duct about its longitudinal axis into a snap engagement with the conduit shell.

With the multiple outlet duct in assembly position in the conduit shell, it will be seen that the conduit provides auxiliary lateral ducts lying between the side walls 2 of the conduit shell and the walls of the duct channel element to both sides of the multiple outlet duct. As these auxiliary ducts 10 and 11 are physically separated by the multiple outlet duct housing, they may with propriety be used to house the electrical conductors of circuits of different potential, such, for example, as a telephone circuit and a buzzer circuit. As shown in Fig. III, conducting wires 12 and 13 of two different circuits are shown as housed respectively in the auxiliary ducts 10 and 11.

In regions along the length of the conduit, lengths of the multiple outlet duct are not in end abutment, but are spaced to leave within the cavity of the conduit intervals 14 which serve the purpose of junction boxes. In these intervals bridging connection is made between the conductors of the adjacent multiple outlet duct sections, as by use of terminal blocks 15 at which the main conductors 6 and 7 to the multiple outlet duct make electrical connection with bridging lengths of conducting wire 16 and 17. The cover 8 of the multiple outlet duct being absent at these junction spaces 14, auxiliary cover members 18 are utilized wholly to enclose the conduit. As shown in Fig. IV of the drawing, each of these auxiliary cover members 18 has along its longitudinal edges slightly divergent and longitudinally indented flanges 18a. These cover elements thus have a resilient engagement with the edges of the conduit walls 2, and by appropriate positioning of the longitudinal locking indentations in end flanges 18a may be made to engage in such plane that they match with the covers 8 of the multiple outlet duct to provide a cover of uniform external appearance throughout the length of the conduit.

The base 1 of the duct channel element has therein a plurality of knock-outs 19 at which feed connection to the conduit may be made. Figs. II and IV of the drawing illustrate the use of cable connectors 20 adapted to engage armored cable 21 for feeding the conduit. It is to be understood, however, that other suitable feed connection, such, for example, as that disclosed in the application of Martin M. Clayton, Serial No. 81,204 filed May 22, 1936, may be utilized electrically to feed the conduit.

At the junction box shown to the right in Fig. I of the drawing, a feed connection 22 is shown as made at the splices 23 in bridging conductors 16 and 17 for feeding the multiple outlet duct. At the same splices 23 the conducting wires 12 of an auxiliary circuit are taken off and are led into and along the auxiliary duct 10 of the conduit. Obviously, the potential carried in the conducting wires 12 is the same as that in the conductors of the multiple outlet duct.

In the junction box at the left in Fig. I of the drawing, splices 24 are made to the bridging wires 16 and 17 of the multiple outlet duct to feed the conducting wires 13 of a second auxiliary circuit which lies in the auxiliary duct 11 of the conduit. At this same junction box, the conducting wires 25 of a third auxiliary circuit are directly introduced into the interior of the conduit, and are led into and along the auxiliary duct 10. The introduction of these conducting wires 25 is illustrative of the introduction and housing of circuit wires conveying current of potential differing from that of the other circuits. Thus it will be seen that wires 25 do not parallel in the same duct other conducting wires carrying current of different potential, but that disadvantageous inductive effect is avoided in the conduit by the interposition of walls formed of conductive material between circuits possessing diversity in potential. At the junctions the high potential and low potential circuits desirably are separated by insulating barriers of some suitable material, such as fibre or molded insulation, shaped for interposition between adjacent portions of the circuits.

The conducting wires of the auxiliary circuits housed in the conduit may readily be led off from the conduit by drilling through one of the conduit walls 2 at an appropriate point therealong. In Fig. I of the drawing, the conducting wires 25 of one auxiliary circuit are shown as issuing through a drilled opening 26 in the conduit wall.

The conduit of my invention is thus a utility conduit advantageously installed in various positions on building walls. If desired, it may comprise merely the multiple outlet duct and mounting for it, but it possesses also a more general utility, in that the conducting wires of additional circuits may also be separately housed within it. The appearance of the utility conduit as a whole is pleasing, since it may be made of simple contour without surface projections or irregularity in its form.

It is to be understood that, if so desired, each length of multiple outlet duct may be individually fed at a junction box. Also, by appropriately forming the walls of the conduit shell at their opposed edges in the junction box regions, or by appropriately forming the cover strips of the multiple outlet duct, these cover strips may be made also to enclose the junction boxes. It is, however, desirable that the multiple outlet duct covers and the junction box covers be separately applicable and removable in the manner shown and described.

I claim as my invention:

1. A utility conduit comprising a conduit shell adapted for direct mounting on an underlying surface and having a longitudinally extended opening in its upper region spaced from the lateral boundaries of the conduit, lengths of elongate multiple outlet duct each comprising a channel element lying within the conduit, the lengths of multiple outlet duct and the conduit shell in assembly cooperatively defining at least one auxiliary duct within the conduit shell and lying laterally of the multiple outlet duct; and at least one junction box defined by an interval within the conduit which interval is formed by the physical end spacing of adjacent channel elements of the multiple outlet duct lengths, the lengths of multiple outlet duct being electrically interconnected at the junction boxes, said junction boxes accommodating for the making of feed connection to the multiple outlet duct and to the electrical connection of auxiliary duct conductors.

2. A utility conduit comprising a conduit shell having a longitudinally extended opening in its upper region spaced from the lateral boundaries of the conduit, lengths of elongate multiple outlet duct each length comprising a channel element lying within the conduit, the lengths of multiple outlet duct and the conduit shell in assembly cooperatively defining at least one auxiliary duct within the conduit and lying laterally of the multiple outlet duct; and at least one junction box defined by an interval within the conduit shell which interval is formed by the physical end spacing of adjacent channel element of the multiple outlet duct lengths, said junction boxes accommodating for the making of feed connection to lengths of multiple outlet duct, and to the electrical connection of auxiliary duct conductors.

3. A utility conduit in accordance with the definition of claim 1 comprising separately applicable and removable cover elements for the multiple outlet duct channel elements and for the junction box adapted respectively for engagement to the walls of the duct channel element and for engagement with the conduit shell in the region thereof forming a junction box.

4. A utility conduit in accordance with the definition of claim 2 comprising separately applicable and removable cover elements for the multiple outlet duct channel elements and for the junction box adapted respectively for engagement to the walls of the duct channel element and for engagement with the conduit shell in the region thereof forming a junction box.

ALFRED CORBETT.